United States Patent Office 3,248,849
Patented May 3, 1966

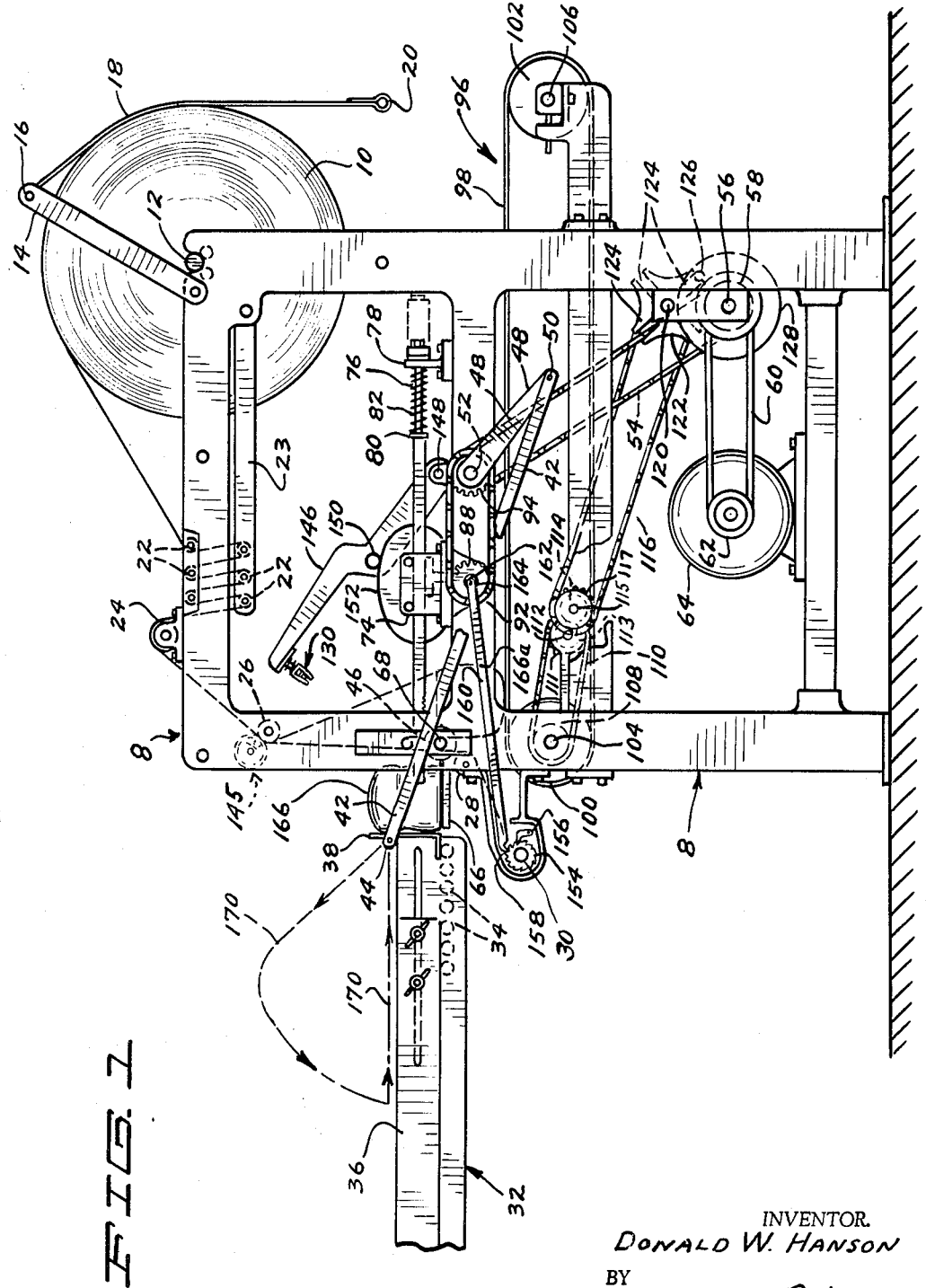

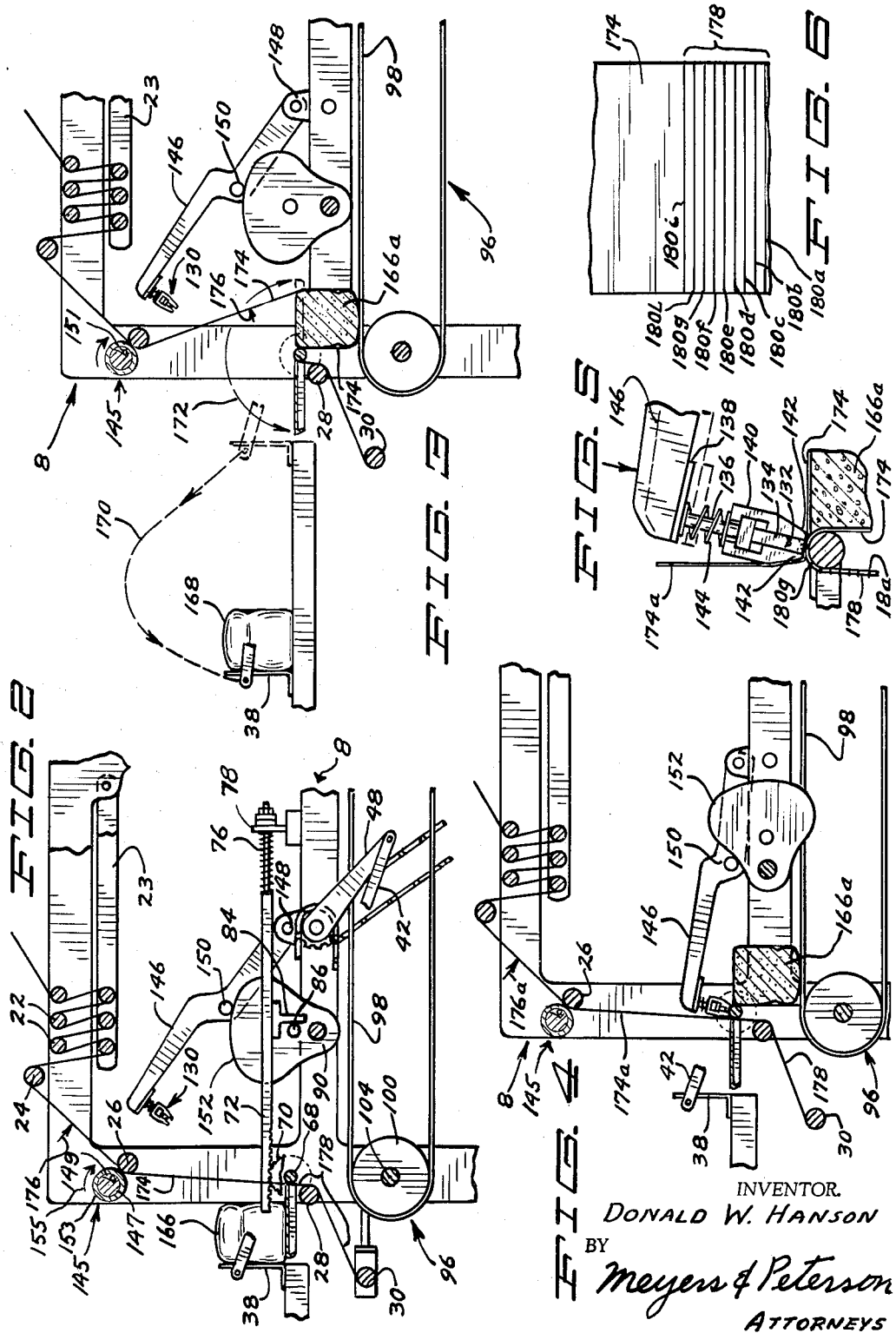

3,248,849
METHOD AND APPARATUS FOR BANDING ARTICLES WITH THERMOPLASTIC MATERIAL
Donald W. Hanson, Northfield, Minn., assignor to G. T. Schjeldahl Company, Northfield, Minn., a corporation of Minnesota
Filed Sept. 24, 1962, Ser. No. 225,796
9 Claims. (Cl. 53—210)

This invention relates generally to the art of banding an article or group of articles with thermoplastic material, and pertains more particularly to a method and apparatus finding especial utility in the wrapping of bread and like items.

One object of the invention is to completely band either a single object or a plurality of objects with a section of thermoplastic material from a continuous supply of such material, yet at the same time leaving only a single bead resulting from the combined severing and heat sealing operation.

The invention has for a rather specific object, this object pertaining to the banding or wrapping of articles having a generally rectangular cross section, the location of the bead or seam along one edge. When wrapping bread, it can be pointed out that this edge can conveniently be disposed along one of the edges that will ultimately constitute a lower edge when the bread is displayed so that the presence of the seam will be virtually unnoticed.

Another object of the invention is to provide an automatic shifting or advancing of the selvage or waste material after each banding or wrapping operation has taken place in order to present a span of new material devoid of seams.

Still further, the invention has for an object the provision of only a small amount of waste material resulting from each operation, thereby rendering the procedure quite economical.

Yet another feature of the invention is to accommodate items that may vary in size with respect to each other, the banding operation still resulting in a band that quite tightly encircles the particular item or items being wrapped.

These and other objects and advantages of the invention will more fully appear from the following description, made in connection with the accompanying drawings, wherein like reference characters refer to the same or similar parts throughout the several views and in which:

FIGURE 1 is a side elevational view of apparatus that can be used in practicing the method herein disclosed;

FIGURE 2 is a fragmentary view showing in greater detail certain of the elements appearing in FIGURE 1, the view illustrating the apparatus in a position just prior to the inauguration of a bread wrapping operation;

FIGURE 3 is a view depicting the apparatus in a more advanced stage, the loaf of bread shown in FIGURE 2 being partially banded or wrapped;

FIGURE 4 represents still another view generally similar to FIGURES 2 and 3 but showing the severing and heat sealing step about to take place;

FIGURE 5 is an enlarged fragmentary detail of FIGURE 4 picturing the sealing head with greater particularity; and FIGURE 6 is a fragmentary view from the left in FIGURE 1 showing the thermoplastic sheet material in the vicinity of the heat sealing station above and below the location of the sealing head as it appears in FIGURES 4 and 5.

Referring now in detail to FIGURE 1, it will be discerned that a frame has been generally indicated by the reference numeral 8. Supported on the frame 8 is a supply roll 10 of thermoplastic material, the roll 10 being disposed on a shaft 12 freely journaled by the frame. A pair of pivotal arms 14 are located at the opposite ends of the supply roll 10 and carry at their upper ends a cross bar 16 having a flexible drag strap 18 suspended therefrom with a weight member 20 in the form of a metal bar at the lower end. As its name indicates, the drag strap 18 imposes a frictional drag upon the supply roll 10 as its thermoplastic material is pulled therefrom.

Tracing the path that the thermoplastic material traverses, it will be seen that cooperating take-up rollers 22 are carried on the frame 8 and on the free end of a pair of pivotal arms 23. After passing by the take-up rollers 22, the thermoplastic material passes over a top guide roller 24, and then proceeds downwardly at an angle to an intermediate guide roller 26. From the intermediate guide roller 26 the material proceeds downwardly and passes under a bottom guide roller 28. In passing from the intermediate guide roller 26 to the bottom guide roller 28, the path is substantially vertical and is, of course, planar for a purpose hereinafter made use of.

Also carried on the frame 8 is a waste roll 30 that serves an important purpose in carrying out the teachings of the present invention. However, the means for actuating the waste roll 30 is better reserved for discussion hereinafter.

At this time, attention is directed to a conveyor 32 for feeding or delivering sliced bread that is to be wrapped, this being the item selected to illustrate the invention. The conveyor 32 may constitute a number of constructions, but for the purpose of discussion, it can be assumed to include a plurality of rollers 34 and two sides 36 for maintaining the slices of each loaf of bread in contact with each other.

In order to move the bread along the conveyor 32, which has been described above as including a number of rollers 34, there is an L-shaped puller 38 that is actuated by two rather long link members 42 having connection with the puller 38 by reason of a pivot pin 44 at each side of said puller. The links 42 rest on support rollers 46 which cooperate in imparting a prescribed movement to the puller 38 that is effectual in moving the bread to a desired position. It will be discerned that the end of the visible link 42 remote from the puller 38 is connected to a crank 48 through the agency of a pin 50, the crank 48 in turn being mounted or carried on a crank shaft 52. Although the sprocket on the crank shaft 52 cannot be seen because it is concealed by another sprocket yet to be mentioned, nonetheless, it will be appreciated that the chain 54 encircles such a sprocket, the chain extending downwardly to a shaft 56. On the shaft 56 is a pulley 58 about which is trained a flexible belt 60. The belt 60 also encircles a drive pulley 62 on an electric motor 64.

Because in the practice of the present invention there is needed a mechanism for inverting the bread during the banding or wrapping process, a bread inverting platen or rocker plate 66 is provided, the platen 66 receiving the bread as it arrives via the conveyor 32. The platen 66 is rocked about a rod 68, and at this time it can be mentioned that the support rollers 46 can be mounted for free rotation on this same rod; the rod also serves as an anvil during the severing and heat sealing step yet to be described. In FIGURE 2, a portion of a pinion 70 is exposed and this pinion is in mesh with a rack 72 that is constrained for reciprocal movement by a guide 74. Also assisting in the guiding action is an extension rod 76 on the rack 72, the extension rod 76 passing through a guide 78. By reason of a flange 80 and a spring 82 bearing thereagainst, the rack 72 is normally urged or biased to the left as viewed in FIGURES 1 and 2.

While the pinion 70 and the rack 72 play an important role in the rocking of the platen 66, the means for providing the intermittent rocking action at the appropriate time includes a downwardly projecting dog 84 that is carried on the underside of the rack 72. This downwardly projecting dog 84 is engageable by a crank pin 86 on a sprocket 88. From FIGURES 2-4, it can be appreciated that there is a shaft 90 and the sprocket 88 is affixed to this particular shaft. A chain 92 is in mesh with the sprocket 88 and is also engaged with a sprocket 94 on the previously-mentioned shaft 52 that is driven by the motor 64 through the chain 54.

A second conveyor 96 is employed on which the bread is placed after its inversion by the platen 66. This conveyor 96 includes an endless apron or belt 98 that encircles rollers 100 and 102 which are mounted on shafts 104 and 106, respectively. The means for operating the second conveyor 96 comprises a sprocket 108 on the shaft 104 about which passes a chain 110. The right end of the chain 110 encircles an intermediate sprocket 111 on a shaft 112. The shaft 112 has a gear 113 thereon in mesh with a gear 114 on a shaft 115. The shaft 115 has a sprocket 117 thereon which is driven by a second chain 116 that encircles a sprocket (not visible) on a shaft 120. Also mounted for rotation with the shaft 120 is a slotted wheel 122 having four quadrantly located slots labeled 124. The purpose of the slotted wheel is to give intermittent drive to the conveyor 96.

Attention is now to be directed to a sealing head generally denoted by the reference numeral 130. This head 130 includes a hot wire 132, the means of energization thereof not being shown. However, the hot wire is best seen from an inspection of FIGURE 5 and it will be appreciated that it extends the full width of the material taken from the supply roll 10. Actually, the hot wire 132 is carried at the lower end of a T-shaped base or support 134 (FIGURE 5) having mounting pins 136 extending upwardly therefrom into integral engagement with a transverse mounting strip 138. A clamping member 140 is internally configured so as to allow it to be slidably moved relative to the T-shaped base or support 134. The purpose of the clamping member 140 is to press against the material during the actual sealing action by the wire 132, and to achieve its intended purpose, the clamping member is provided with a pair of spaced material engaging or pressing portions 142. The clamping member 140 is biased or urged toward the material by coil springs 144 which encircle the supporting pins 136.

The sealing head is carried at the upper ends of a pair of arms 146, the transverse strip 138 being secured to the undersides of these two arms. A pivot shaft 148 mounts the lower ends of the arms 146 and by means of a follower 150 on one of the arms 146 the arms can be raised by a lift cam 152 that is keyed to the previously-mentioned shaft 90. The means for driving the shaft 90 has already been referred to.

Inasmuch as the rod 68 has already been mentioned in conjunction with the description of the bread inverting platen or rocker plate 66, it can readily be understood at this time that the central portion of this same rod can be used as the anvil against which the sealing head 130 presses the material when the hot wire 132 is performing both a sealing and severing function. Suggestively, a one-way clutch roller mechanism 145 is employed which includes a fixed shaft 147 having at least one wedge-shaped notch 149 formed therein containing a ball or cylinder 151 which coacts with a rotable rim 153 to permit rotation of the rim only in the direction of the arrow 155; this mechanism 145 prevents the material from pulling apart at the joint formed by the hot wire 132 even though the sealing head is retracted before the joint has congealed. However, the sealing and severing action will be better understood when an operational sequence is subsequently presented.

The means or mechanism for advancing the waste or selvage roll 30 includes a ratchet 154 integral therewith and a spring-pressed detent 156 that normally acts to prevent the roll 30 from shifting when it is not supposed to. A pawl 158 at the end of a rather long strip 160 constitutes the specific element for causing the advancement of the waste or selvage roll 30 and also functions to prevent reverse rotation of the roll 30 with an attendant undesired withdrawal of the waste material thereon. To move the strip 160, and of course its pawl 158, an eccentric 162 is mounted on the shaft 90 so as to rotate in unison therewith, a pin 164 providing the necessary mechanical connection between the eccentric and the end of the strip 160 residing opposite to the end having the pawl 158 thereon. Thus, for each revolution of the eccentric 162, the pawl 158 will be advanced the distance equivalent to that between two adjacent teeth. This causes the incremental or step-wise advancement of the roll 30.

Having presented the foregoing description, it is believed that the method that is employed and the operation of the apparatus that has been herein disclosed will both be easily understood. Assuming that the apparatus is to be used for wrapping or banding bread with thermoplastic material, a loaf of sliced bread has been shown at 166. This loaf appears in both FIGURES 1 and 2. However, from FIGURE 3 it will be discerned that a second loaf of bread 168 has been pictured. It is the function of the puller 38 to move the first loaf of bread 166 from the position in which it originally appeared, this being the position now occupied by the loaf 168 in FIGURE 3. The puller 38 traverses a path indicated by the arrows 170 in FIGURES 1 and 3. This motion is, of course, derived from the motor 64 and in this regard it will be pointed out that the pulley 62 rotates in a clockwise direction to similarly rotate the pulley 58 on the shaft 56. Owing to the chain 54, the shaft 52 is likewise caused to rotate in a clockwise direction with the consequence that the crank 48 moves downwardly from the position in which it appears in FIGURE 1. The link 42 is in riding engagement with the underlying roller 46 so that it moves upwardly and to the left with its companion link, carrying the puller 38 therewith. The puller 38 is lowered as the crank 48 moves in an arcuate path upwardly and then is pulled to the right in FIGURE 1 to move the bread from the position in which the loaf 168 appears in FIGURE 3 to that in which the loaf 166 appears in FIGURES 1 and 2.

The role played by the bread inverting platen or rocker plate 66, as its name indicates, is to invert the loaf 166 from the position in which it is shown in FIGURES 1 and 2 to that in which it is shown in FIGURES 3 and 4. To differentiate the orientation of the same loaf of bread, the suffix "a" has been added to the reference numeral in FIGURES 3 and 4. Also, it is believed helpful to show in phantom outline the position of the loaf 166 in its inverted condition, and the reference numeral 166a also appears in FIGURE 1 in addition to FIGURES 3 and 4 (and also FIGURE 5 because FIGURE 5 is an enlargement of FIGURE 4).

The path taken in flipping or upsetting the loaf of bread 166 has been indicated by the arrows 172 in FIGURE 3. All that really occurs is that the platen 66 is moved through 180° about the rod 68. The means for accomplishing this rocking action stems from the engagement of the rack 72 with the pinion 70. The rack 72 is moved to the right by the engagement of the crank pin 86 on the sprocket 88 with the downwardly projecting dog 84 on the underside of the rack 72. After the crank pin 86 has passed beyond the dog 84, the spring 82 returns the rack 72 to the left and, of course, the platen 66 is moved into a horizontal position for receiving the next loaf of bread.

It is important to understand, though, that as the platen 66 is swung upwardly and then downwardly, as indicated by the arrows 172, the loaf of bread 166 is forced against the span of material then present between the guide roller 26 and the rod 68. It is believed helpful to assign the reference numeral 174 as being indicative of this span of material that has been drawn from the supply roll 10. It will also be of assistance, it is thought, to apply an arrow 176 which determines the upper limit of the section of material that will be utilized in completely encircling the loaf of bread 166.

At any rate, it will be appreciated that as the loaf of bread 166 is forced against the span of material between the guide roller 26 and the rod 68 the material is deflected from the position in which it is pictured in FIGURE 2 to that in which it is shown in FIGURE 3. As the deflecting action progresses from the vertical position of the material in FIGURE 2 to the inclined direction shown in FIGURE 3, three sides of the bread 166a will become wrapped. What was previously the lower side of the bread, now the upper side, remains unwrapped or unbanded in FIGURE 3.

Owing to the particular contour of the cam 152, in FIGURE 4 the cam has rotated into a position that lowers the arms 146 which carry the sealing head 130. During the lowering of the sealing head 130, its clamping member 140 deflects the thermoplastic material back into a substantially vertical relationship, this being the relationship shown in FIGURE 2, and at the same time completes the wrapping process for the material is deflected abut the fourth or now upper side of the loaf and its position 166a.

Attention is called to FIGURE 5, which shows on a larger scale the sealing head 130, and in this figure it is to be observed that the edges 142 of the clamping member 140 first engage and press together the adjacent portions of the thermoplastic material. Further downward movement of the arms 146 is responsible for moving the T-shaped base 134 relative to the clamping member 140 so as to effect a contact of the heated wire 130 with the material. Not only does the hot wire 130 sever the two layers of thermoplastic material, but this action simultaneously effects a sealing of these materials to each other. Thus, after the severing action has taken place, there will be one seal at the side that involves the wrapped bread and another seal remains on the material that will provide the continuous supply of such material that is to be used for wrapping or banding subsequent loaves of bread.

Stated somewhat differently, the section of material labeled 174 in FIGURE 2 has been completely used for encircling the loaf of bread as it appears in FIGURE 4. Inasmuch as all of this material has been taken from the supply roll 10, this brings into position a completely new section of thermoplastic material which has been identified in FIGURE 4 as 174a with the new point 176a corresponding to the previous point 176. Therefore, in wrapping the next loaf of bread, which would be the loaf assigned the reference numeral 168 in FIGURE 3, the new section of material 174a would be utilized, the same procedure occurring that has been outlined above.

It has already been stated that all of the material is drawn from the supply roll 10. By this, it is meant that the waste roll 30, as its name indicates, is only for waste or selvage purposes and does not provide any of the thermoplastic material utilized in the wrapping process. To further help in understanding this, the section of material extending generally from the rod 68, this being the anvil, to the selvage roll 30 has been assigned the reference numeral 178. This section of material 178 is shown to better advantage in FIGURE 6 and the section 174 (or 174a as the case may be) has been shown in conjunction therewith. FIGURE 6, thus, depicts a number of selvage lines 180a, 180b, 180c, 180d, 180e, 180f, 180g, 180h and 180i. Each of these selvage seams or lines represents one severance that has been made by the sealing head 130.

Explained in a slightly different fashion, the selvage or waste roll 30 is advanced or incrementally shifted by the pawl 158 which is in engagement with the ratchet 154. This advancement takes place each time that the eccentric 162 is rotated through a complete revolution. Due to the small angular spacing existing between the adjacent teeth of the ratchet 154, only a very small amount of advancement takes place. However, the advancement, although small, is instrumental in shifting the selvage line or seam 180 slightly from the position in which it assumes immediately after the severing operation by the sealing head 130. Consequently, each of the lines 180 in FIGURE 6 is indicative of a sealing and severing operation having taken place and therefore is representative of a bread wrapping procedure in each instance.

The manner in which the eccentric 162 is rotated is readily understandable inasmuch as the eccentric 162 is on the same shaft as is the sprocket 88. The sprocket 88 is rotated by virtue of the chain 92 that encircles this sprocket as well as the sprocket 94 on the shaft 52. The rotation of the shaft 52 has already been adequately described, it is believed, inasmuch as the motor 64 is responsible for imparting rotation to said shaft 52.

It will be appreciated, though, that the conveyor 96 is not operating or moving constantly. The intermittent motion is provided by reason of the slotted wheel 122. Hence, both the chains 116 and 110 are moved only at certain times, these times being in correspondence with the need for moving the completely wrapped loaf of bread from the position in which it appears as 166a to a discharge point at the right end of the apron 98. In other words, when the bread is in the position in which it appears as 166a in FIGURE 3 and also during the sealing action that takes place in FIGURE 4, there is no movement of the conveyor 96. However, immediately thereafter, the slotted wheel 120 is responsible for moving the completely wrapped bread out of the way so that the next loaf can be wrapped.

It should be perceived that the wrapped loaf of bread has only one sealed edge. If the loaf of bread in the position shown as 166 in FIGURES 1 and 2 can be said to be in its upright position, then the lower right hand edge will be the one that will have the seal extending therealong. This is a highly desirable feature because it will go virtually unnoticed by the purchaser. While the ends of the bread have not been dealt with herein, it can be stated for the sake of simplicity that the original width of the thermoplastic material is such as to permit the side marginal edges thereof to extend sufficiently beyond the ends of the loaf of bread so as to permit them to be gathered or folded in a preferred manner.

It will, of course, be understood that various changes may be made in the form, details, arrangements and proportions of the parts without departing from the scope of the invention as set forth in the appended claims.

What is claimed is:

1. Apparatus for banding articles with thermoplastic material comprising:
    (a) means for presenting a span of thermoplastic material at a given location and including means for supporting a supply of said material;
    (b) pivotal means for urging an article to be banded against one side of said span and to invert said article so as to partially band said article with thermoplastic material;
    (c) pivotal clamping means for engaging the other side of said span after said article has been partially banded for flexing said span completely about said article and to bring previously spaced portions of material into contact with each other;
    (d) a heated wire carried by said clamping means for simultaneously severing and heat sealing said portions together; and
    (e) means for advancing the resulting selvage produced by said heated wire in a direction to present a new span of thermoplastic material in the path of said pivotal means which is devoid of heat sealed junctures formed by said heated wire, said means for presenting said span being particularly characterized in that said thermoplastic material is resistively movable in a direction toward said span to provide a predetermined tension in the material forming the span, and is constantly restrained against movement in a direction away from said span.

2. Apparatus for banding articles with thermoplastic material comprising:
   (a) a frame;
   (b) means for supporting a supply roll of thermoplastic material mounted on said frame supplying said material to said apparatus;
   (c) means for supporting a waste roll mounted on said frame in a spaced relation with said supply roll taking waste thermoplastic from said apparatus;
   (d) means for directing thermoplastic material in strip form from said supply roll to said waste roll to present a span of said material;
   (e) anvil means located at one side of said span;
   (f) means at the other side of said span for advancing an article to be banded against said span to deflect said span about a locus provided by said anvil means and to simultaneously band all but one side of said article;
   (g) clamping means;
   (h) arm means pivotally connected at one end to said frame and carrying said clamping means at the other end for causing said clamping means to engage a section of said material not yet banded about said article to cause two originally spaced portions of material to be brought into contact with each other and thus complete the encirclement of the article with thermoplastic material;
   (i) a heated wire associated with said clamping means for simultaneously severing and heat sealing said portions together; and
   (j) means for advancing the resulting selvage produced by said heated wire in a direction to present a new span of thermoplastic material in the path of said advancing means which is devoid of heat sealed junctures formed by said heated wire, said span presenting means being particularly characterized in that said thermoplastic material is resistively movable in a direction toward said span to provide a predetermined tension in the material forming the span, and is constantly restrained against movement in a direction away from said span.

3. Apparatus for banding articles with thermoplastic material comprising:
   (a) a frame;
   (b) means for delivering articles to be banded to one location on said frame;
   (c) means for passing a strip of thermoplastic material past said location;
   (d) anvil means adjacent said one location;
   (e) means adjacent said location for moving an article to be banded against said strip of material to bend said material about said anvil means and to partially band said article;
   (f) means cooperable with said anvil means for clamping portions of said strip of material together to complete the banding of said article;
   (g) means for severing and heat sealing said portions to separate the banded article from said strip and to re-seal said strip in preparation for a succeeding banding operation;
   (h) means for advancing said re-sealed strip sufficiently so that the region where the re-sealing takes place is shifted sufficiently so that it will not be included in the succeeding banding operation;
   (i) means for permitting the strip passing means to introduce said thermoplastic material to said location under a predetermined tension and in a certain predetermined direction, and means to constantly restrain movement of said material in a direction opposite to said predetermined direction; and
   (j) said article moving means including a pivotally mounted platen for inverting said article as it is moved.

4. Apparatus in accordance with claim 3 including:
   (a) means for removing each banded article after inversion by said platen and separation by said severing and heat sealing means.

5. Apparatus for banding articles with thermoplastic material comprising:
   (a) a frame;
   (b) means for supporting a supply roll of thermoplastic material rotatably carried on said frame supplying said material to said apparatus;
   (c) means for supporting a waste roll mounted on said frame in a spaced relation with said supply roll for removing waste thermoplastic material from said apparatus;
   (d) a transverse member on said frame;
   (e) guide means for directing material from said supply roll to said waste roll past said transverse member;
   (f) a platen pivotal about said transverse member for forcing an article to be banded against said material to invert same and simultaneously bend said material about said transverse member to partially band said article with material withdrawn from said supply roll;
   (g) arm means pivotally connected at one end to said frame;
   (h) a clamping member carried at the other end of said arm means for engaging the thermoplastic material deflected by said article after inversion by said platen to urge originally spaced portions of said material against said transverse member and thus completely encircle said article with thermoplastic material;
   (i) a heated wire associated with said clamping member for simultaneously severing and heat sealing said portions;
   (j) means for rotating said waste roll sufficiently to shift the juncture formed by said heated wire in a direction so that it will not be included in the material utilized in banding a succeeding article; and
   (k) means for permitting said supply roll to deliver thermoplastic toward said transverse member under a certain predetermined tension, and means for restraining movement of said thermoplastic material from said transverse member and toward said supply roll.

6. Apparatus for banding articles with thermoplastic material comprising:
   (a) a frame;
   (b) means for supporting a supply roll of thermoplastic material rotatably carried on said frame supplying said material to said apparatus;
   (c) a waste roll for removing waste thermoplastic material from said apparatus mounted on said frame in a spaced relation with said supply roll for removing waste thermoplastic material from said apparatus;
   (d) a ratchet fixedly connected to said waste roll;
   (e) a pawl engaging said ratchet to normally prevent said waste roll from rotating in a reverse direction the thermoplastic material contained thereon;
   (f) a transverse member on said frame;
   (g) guide means for directing material from said supply roll to said waste roll past said transverse member;
   (h) a platen pivotal about said transverse member for forcing an article to be banded against said material to invert same and simultaneously bend said material about said transverse member to partially band said article with material withdrawn from said supply roll;
   (i) arm means pivotally connected at one end to said frame;

(j) a clamping member carried at the other end of said arm means for engaging the thermoplastic material deflected by said article after inversion by said platen to urge originally spaced portions of said material against said transverse member and thus completely encircle said article with thermoplastic material;

(k) a heated wire associated with said clamping member for simultaneously severing and heat sealing said portions;

(l) means for actuating said pawl to rotate said waste roll sufficiently to shift the juncture formed by said heated wire in a direction so that it will not be included in the material utilized in banding a succeeding article; and (m) said guide means permitting movement of material under a certain predetermined tension from said supply roll toward said waste roll, and preventing movement of material in a direction toward said supply roll.

7. Apparatus in accordance with claim 6 including:
(a) cam means for actuating said arm means in a timed relationship with the actuation of said pawl so that the banding of said article takes place when said waste roll is stationary.

8. Apparatus in accordance with claim 6 in which:
(a) said clamping member has two parallel material engaging sections and said heated wire is located between said parallel sections.

9. Apparatus in accordance with claim 8 including:
(a) spring means normally biasing said clamping member in a direction beyond said heated wire, said spring means yielding to permit said heated wire to engage said material portions after said portions have been first pressed against said transverse member.

References Cited by the Examiner

UNITED STATES PATENTS

| 1,192,351 | 7/1916 | Schiff | 53—210 X |
| 1,194,350 | 8/1916 | Beers | 53—211 X |
| 1,626,409 | 4/1927 | Gwinn | 242—74.2 |
| 3,006,122 | 10/1961 | Weishaus | 53—182 |
| 3,060,658 | 10/1962 | Horsting | 53—198 X |
| 3,097,462 | 7/1963 | Langdon | 53—198 X |

FOREIGN PATENTS 219,107    7/1924    Great Britain.

FRANK E. BAILEY, *Primary Examiner.*

TRAVIS S. McGEHEE, *Examiner.*